UNITED STATES PATENT OFFICE.

EMILE KARL BAOYERLIN AND FREDERICK E. HEINIG, OF LOUISVILLE, KENTUCKY; SAID BAOYERLIN ASSIGNOR TO SAID HEINIG.

BINDER FOR ARTIFICIAL FUEL.

SPECIFICATION forming part of Letters Patent No. 480,243, dated August 9, 1892.

Application filed November 25, 1891. Serial No. 413,140. (No specimens.)

*To all whom it may concern:*

Be it known that we, EMILE KARL BAOYERLIN and FREDERICK EDWARD HEINIG, of Louisville, in the county of Jefferson, in the State of Kentucky, have invented new and useful Improvements in Binders for Artificial Fuel, of which the following is a full, clear, and exact description.

This composition consists in the following elements, combined in the proportions and in the manner as follows, to wit: Of vegetable pulp we take one hundred pounds, of Irish moss we take twelve and one-half pounds, and of asbestus fiber we take fifteen pounds, mixed with twelve and one-half pounds of calcined limestone reduced to a powder, and mix it all with water and boil the whole mass thoroughly, taking about thirty-five gallons of water at first and increasing the amount in the kettle from time to time during boiling, so as to keep the volume of water at about two hundred per cent. of the amount of the other ingredients therein.

To secure the vegetable pulp, we may use straw, sawdust, shavings, paper, or any suitable vegetable-containing substances and thoroughly digest them in acids to decompose them, after which they are mixed with the other ingredients of our compound.

The object for which this compound is to be used is a binder for retaining coherent the blocks of artificial fuel, and it has been found in practice to be an excellent composition for the purpose, as it will burn very freely, will hold the particles composing the blocks firmly together under the most severe tests of heat, and will leave but little ash as the result of combustion, thus making it an excellent substitute for the many compositions at present used for the same purpose.

Having described our invention, what we claim as new, and desire to secure by Letters Patent, is—

The herein-described composition of matter to be used as a binder in the manufacture of artificial fuel, consisting of vegetable pulp, Irish moss, calcined limestone, asbestus fiber, and water, substantially in the proportions stated.

In testimony whereof we have hereunto set our hands this 23d day of November, 1891.

EMILE KARL BAOYERLIN.
FREDERICK E. HEINIG.

Witnesses:
FREDERICK H. GIBBS,
H. WOLTRING.